United States Patent Office 3,250,778
Patented May 10, 1966

3,250,778
INTERMEDIATES FOR AND SYNTHESIS OF VITAMIN B₆ AND RELATED COMPOUNDS
Walter Kimel, Highland Park, and Willy Leimgruber, Nutley, N.J., assignors to Hoffmann-La Roche Inc., Nutley, N.J., a corporation of New Jersey
No Drawing. Filed Nov. 29, 1962, Ser. No. 241,019
22 Claims. (Cl. 260—297)

This invention relates to a method of preparing compounds of the formula:

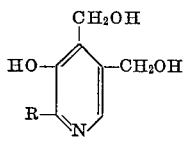

wherein R is lower alkyl, and acid addition salts thereof.

The compounds of the above formula are a known class of compounds. The most valuable member of this class is wherein R is methyl and hence compounds wherein R is methyl are preferred. Said compound is vitamin $B_6$, i.e. pyridoxol (also sometimes referred to as pyridoxine).

The invention also comprehends novel intermediates involved in the preparation of compounds of Formula I above.

According to one embodiment of the invention, compounds of Formula I above are preferred from compounds of the formula:

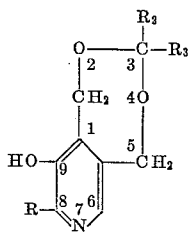

wherein R has the same meaning as above, $R_2$ and $R_3$ are each a member of the group consisting of, individually, hydrogen, lower alkyl, lower alkenyl, aryl and, taken together, lower alkylene, and acid addition salts thereof. The numbering of the ring system of compounds of Formula II is shown above for the purposes of convenience.

Compounds of Formula I above can be prepared from compounds of Formula II above via acid hydrolysis.

The compounds of Formula II above form acid addition salts with both organic and inorganic acids such as hydrochloric acid, hydrobromic acid, sulfuric acid, oxalic acid, picric acid, succinic acid, methanesulfonic acid, toluenesulfonic acid, and the like.

As used herein the term lower alkyl represents both straight and branched chain saturated hydrocarbon groups such as methyl, ethyl, propyl, isopropyl and the like. The term lower alkanoyl comprehends both straight and branched chain residues of lower alkyl carboxylic acids such as acetyl, propionyl and the like. The term lower alkenyl comprehends both straight and branched chain unsaturated hydrocarbon groups such as 2-propenyl and the like. The term lower alkylene comprehends straight or branched chain saturated hydrocarbon groups having two terminal carbon atoms, such as a polymethylene, for example, pentamethylene.

According to the process of this invention, compounds of Formula II above are prepared from 4,7-dihydro-1,3-dioxepins of the formula:

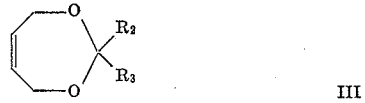

wherein $R_2$ and $R_3$ have the same meaning as above.

by condensation with an oxazole of the formula:

wherein R has the same meaning as above and $R_4$ is a member of the group consisting of lower alkoxy and cyano.

The term lower alkoxy comprehends both straight and branched chain alcohol residues such as methoxy, ethoxy, and the like. The reaction of a compound of Formula III with a compound of Formula IV results in the formation of an intermediate of the formula:

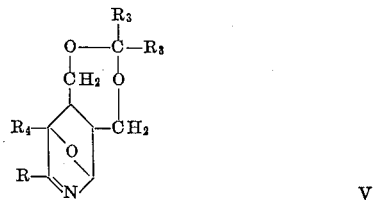

wherein R, $R_2$, $R_3$ and $R_4$ have the same meaning as above.

This intermediate of Formula V collapses under the conditions of the reaction with loss of $HR_4$ resulting in the formation of a compound of Formula II.

The compounds of Formula III are, for the most part, known compounds. However, certain members of the group are unknown and their preparation is set forth in the examples below. These novel starting materials are within the scope of the invention.

The reaction of a compound of Formula III with a compound of Formula IV is suitably conducted at an elevated temperature, preferably at greater than about 80° C., but at less than about 250° C. The upper temperature limit is, of course, determined by the stability of the materials, i.e. the reaction should not be conducted at such a temperature as results in the decomposition of either the starting material of Formulas III and IV or of the desired end product of Formula II. It is especially preferred to conduct the reaction at a temperature between about 150° C. and about 200° C.

The reaction can be effected using an excess of the compound of Formula III, or an excess of the compound of Formula IV, or using the two starting materials in equimolar amounts. However, it is preferred to conduct the reaction utilizing an excess of the starting material of Formula III.

The reaction can be effected with or without the use of a solvent. In one embodiment of the invention, the compound of Formula III serves as a solvent for the reaction mixture. In another embodiment, the reaction can be conducted in the presence of an organic solvent inert to the starting materials of Formulas III and IV and the end product of Formula II. Moreover, it has been found that the condensation reaction of a compound of Formula IV with a compound of Formula III is acid catalyzed. For example, the reaction can be catalyzed by the use of acids such as acetic acid, trichloroacetic acid, p-toluenesulfonic acid or the like. The use of such agents is, however, not preferred since the oxazole starting materials of Formula IV are acid sensitive at the reaction temperatures utilized. However, it has been found that the reaction is advantageously self-catalyzed, i.e. the end product of Formula II serves to catalyze the reaction of a compound of Formula III with a compound of Formula IV to produce the end product of Formula II. This can perhaps be attributed to the acidic character of the compound of Formula II.

The compounds of Formula II prepared by the above discussed reaction can be hydrolyzed to compounds of Formula I. This hydrolysis can be effected by the use of acids. Thus, acid hydrolysis of a compound of Formula II will yield a corresponding compound of Formula I. The hydrolysis can be effected by both organic and inorganic acids. For example, there can be used acetic acid, aqueous hydrochloric acid, alcoholic hydrochloric acid such as methanolic hydrochloric acid or ethanolic hydrochloric acid, aqueous acetic acid/perchloric acid or the like. The strength of the acid is not critical, but increasing strength of the acid results in faster rates of hydrolysis. Compounds of Formula II wherein both $R_2$ and $R_3$ are other than hydrogen are the most susceptible to hydrolysis. The compounds of Formula II where one of $R_1$ and $R_2$ are hydrogen are less susceptible to acid hydrolysis, and it has been found that compounds of Formula II wherein both $R_2$ and $R_3$ are hydrogen are the slowest to hydrolyze. The acid hydrolysis can be effected at any temperature but elevating the temperature increases the rate of hydrolysis.

In a preferred embodiment of the invention, a compound Formula I are directly prepared from compounds of Formulas III and IV without isolation of the intermediate compounds of Formula II. In other words, the product of the condensation of a compound of Formula III and a compound of Formula IV is subjected to acid hydrolysis in situ without being isolated. This can be effected by simple addition of acid to the reaction mixture.

In a preferred embodiment of the invention, a compound of Formula III wherein at least one of $R_2$ and $R_3$ is hydrogen, is condensed with a compound of Formula IV. This reaction will yield an intermediate of the Formula:

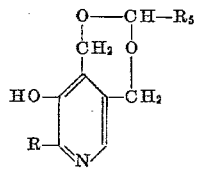

VI wherein R has the same meaning as above and $R_5$ is a member of the group consisting of hydrogen, lower alkyl, lower alkenyl and aryl.

This intermediate of Formula VI can then be subjected to acid hydrolysis, with or without being isolated, as described above, to yield a corresponding compound of Formula I. Especially preferred is the use of starting materials such that in the compound of Formula VI, $R_5$ is hydrogen or lower alkyl, particularly, isopropyl.

In another embodiment of the invention, the reaction of a compound of Formula III with a compound of Formula IV is conducted in the presence of a lower alkanoylating agent, for example, a lower alkanoyl halide or a lower alkanoyl anhydride. As a result of conducting the reaction in the presence of such an agent, there is obtained an intermediate of Formula II wherein the 9-hydroxy group is esterified, i.e. a compound of the formula:

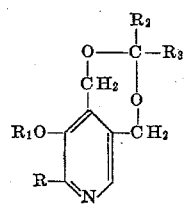

VII where R, $R_2$ and $R_3$ have the same meaning as above and $R_1$ is lower alkanoyl.

Upon acid hydrolysis of this compound, under the same conditions as are used to hydrolyze a compound of Formula II to a compound of Formula I, it has been found that the 9-lower alkanoyloxy substituent hydroyzes to a 9-hydroxy group. This simultaneous hydrolysis of the dioxepin ring and the 9-lower alkanoyloxy group can be effected with or without isolation of the compound of Formula VII.

In addition to the novel processes described above, within the scope of the invention are a variety of novel compounds. Thus, certain of the starting materials of Formula III are novel and form a part of this invention. Moreover, the intermediates of Formula V prepared by the condensation of a compound of Formula III and a compound of Formula IV are novel and form a part of this invention. Moreover, the products of this reaction, i.e. the compounds of Formula II, are novel and form a part of this invention. Said products generically are of the formula:

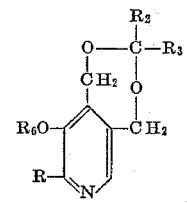

VIII wherein R, $R_2$ and $R_3$ have the hame meaning as above and $R_6$ is a member selected from the group consisting of hydrogen and lower alkanoyl Moreover, within said generic grouping, compounds of the formula:

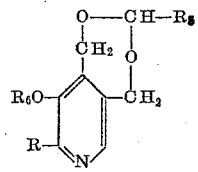

IX wherein R, $R_5$ and $R_6$ have the same meaning as above, constitute a preferred sub-group. It has been found that working through said intermediates, either with or without their isolation, tends to give the best yields of end products of Formula I.

The following examples are illustrative but not limitative of the invention. All temperatures are stated in degree centigrade.

*Example 1*

A mixture of 300 g. cis-2-butene-1,4-diol, 3.0 l. of acetone, 200 g. of anhydrous sodium sulfate and 13 ml. of concentrated sulfuric acid was stirred for 21 hours. The acid was neutralized by the addition of 500 g. lead carbonate with stirring over a period of 20 hours. The inorganic salts were filtered off and the filtrate stirred with 125 g. of anhydrous potassium carbonate for 1½ hours. The filtered solution was concentrated at atmospheric pressure and the residue distilled in vacuo. The fraction boiling at 45–51.5°/20.5–22 mm. Hg was collected and fractionated at atmospheric pressure to give 4,7-dihydro-2,2-dimethyl-1,3-dioxepin as a colorless liquid, B.P. 144.5–147°/755 mm. Hg, $n_D^{24.5}=1.4465$.

*Example 2*

2.16 g. of 4-methyl-5-oxazolecarbonitrile, 2.4 g. of 4,7-dihydro-1,3-dioxepin and 50 mg. of trichloroacetic acid were combined, sealed in a tube and the mixture heated at 150° for 20 hours. The tube was cooled, opened and the reaction mixture treated with 200 ml. of methylene chloride. Insoluble material was filtered off and discarded. The solution was taken to complete dryness by means of a rotary evaporator leaving a partially crystalline residue. Crystallization from ether afforded crude 1,5-dihydro - 8 - methylpyrido[3,4 - e][1,3]dioxepin-9-ol. Sublimation of this material at high vacuum gave purified material, M.P. 175–176°.

*Example 3*

100 mg. of 1,5-dihydro-8-methylpyrido[3,4-e][1,3]dioxepin-9-ol was dissolved in a small amount of hot absolute ethanol. Addition of ethanolic hydrogen chloride and ether afforded after subsequent cooling 1,5-dihydro-8-methylpyrido[3,4-e][1,3]dioxepin-9 - ol hydrochloride. Sublimation of this material in vacuo and crystallization from absolute ethanol-ether gave the purified product, M.P. 208–208.5°.

*Example 4*

1.0 ml. of 4-methyl-5-oxazolecarbonitrile and 6.0 g. of 4,7-dihydro-1,3-dioxepin were introduced into a tube which was sealed and heated for 17 hours at 180°. After cooling, the reaction mixture was transferred to a 500 ml. round bottomed flask, evaporated to complete dryness at high vacuum, and the residue disolved in hot ethanolic hydrogen chloride. Upon addition of ether and subsequent cooling, crystallization occured affording crude 1,5-dihydro-8-methylpyrido[3,4-e][1,3]dioxepin-9-ol hydrochloride. Repeated crystallization from absolute ethanol-ether gave purified product, M.P. 208–208.5°.

*Example 5*

6 g. of 4,7-dihydro-1,3-dioxepin and 1 ml. of 4-methyl-5-oxazolecarbonitrile were introduced into a tube which was sealed and heated for 34 hours at 180°. After cooling, the reaction mixture was transferred to a 500 ml. round bottomed flask and taken to dryness in vacuo. The residue was dissolved in 250 ml. of hot acetic anhydride and refluxed for one hour. After removing the solvent under reduced pressure, the residue was repeatedly extracted with ether and the solution taken to complete dryness after treatment with charcoal and magnesium sulfate. Treatment of the residue with ethanolic hydrogen chloride and ether afforded purified acetate of 1,5-dihydro-8-methylpyrido[3,4-e][1,3]dioxepin-9-ol hydrochloride as white crystals, M.P. 194–195°.

*Example 6*

1.0 g. of acetate of 1,5-dihydro-8-methylpyrido[3,4-e][1,3]dioxepin-9-ol hydrochloride was dissolved in 20 ml. of water and the pH of the solution adjusted to 7.0 with sodium hydroxide.

The neutralized solution was repeatedly extracted with ether, the extracts combined and dried over magnesium sulfate. The solution was taken to dryness and the residue crystallized from ether-petroleum ether (B.P. 30–60°) affording purified acetate of 1,5-dihydro-8-methylpyrido[3,4-e][1,3]dioxepin-9-ol, M.P. 86.5–87.5°.

*Example 7*

3 ml. of 4-methyl-5-oxazolecarbonitrile and 25.6 g. of 4,7-dihydro-2-isopropyl-1,3-dioxepin were combined and heated in a sealed tube at 180° for 48 hours. The reaction mixture was cooled and taken to complete dryness at high vacuum. The residue was dissolved in 800 ml. of ether and insoluble material filtered off and discarded. The filtrate was treated with charcoal and magnesium sulfate, filtered and concentrated at diminished pressure to a small volume. Upon addition of petroleum ether (B.P. 30–60°) crystallization occurred, affording crude 1,5 - dihydro - 3 - isopropyl - 8 - methylpyrido[3,4 - e][1,3]dioxepin-9-ol. Two recrystallizations from the same solvent mixture gave purified product, M.P. 164–164.5°.

*Example 8*

500 mg. of 1,5-dihydro-3-isopropyl-8-methylpyrido[3,4-e][1,3]dioxepin-9-ol were dissolved in 300 ml. of ether. Upon addition of alcoholic hydrogen chloride, precipitation of 1,5-dihydro-3-isopropyl-8-methylpyrido[3,4-e][1,3]dioxepin-9-ol hydrochloride occurred. Recrystallization from absolute ethanol gave purified product, M.P. 190–191° (dec.).

*Example 9*

200 mg. of 1,5-dihydro-3-isopropyl-8-methylpyrido [3,4-e][1,3]dioxepin-9-ol were refluxed for 30 minutes with acetic anhydride. The solvent was removed under reduced pressure, the residue dissolved in ether and the solvent extracted with aqueous sodium bicarbonate, washed with water and dried over sodium sulfate. Hydrogen chloride gas was passed through the ethereal solution yielding an amorphous hydrochloride which was crystallized from absolute ethanol-ether. The crystalline product the acetate of 1,5-dihydro-3-isopropyl-8-methylpyrido[3,4-e][1,3]dioxepin - 9 - ol hydrochloride, thus obtained, melted at 173–173.5°.

*Example 10*

1 ml. of 4-methyl-5-oxazolecarbonitrile and 10.6 g. of 4,7-dihydro-2-phenyl-1,3-dioxepin were combined and heated in a sealed tube at 180° for 51 hours. The reaction mixture was cooled and taken to complete dryness at high vacuum. The residue was extracted with 0.5 l. of ether, and insoluble material was filtered off and discarded. The filtrate was treated with charcoal and magnesium sulfate, filtered and evaporated in vacuo to dryness by means of a rotary evaporator. The residue was chromatographed on silica (Florisil, Floridin Co., Tallahassee, Fla.) and the product eluted by ether. Crystallization from ether gave 1,5-dihydro-8-methyl-3-phenylpyrido[3,4-e][1,3]dioxepin-9-ol, which afforded after two recrystallizations from ether-petroleum ether (B.P. 30–60°) purified product, M.P. 160–160.5°.

*Example 11*

3 ml. of 4-methyl-5-oxazolecarbonitrile and 30.3 g. of 4',7'-dihydrospiro[cyclohexane-1,2'[1,3] - dioxepin] were combined and heated in a sealed tube at 180° for 40 hours. The reaction mixture was cooled and taken to complete dryness at high vacuum. The residue was extracted with 800 ml. of ether and insoluble material was filtered off and discarded. The filtrate was treated with charcoal and magnesium sulfate, filtered and concentrated at diminished pressure to a small volume. Upon addition of petroleum ether (B.P. 30–60°), crystallization occurred, affording crude 1',5'-dihydro-8'-methylspiro-[cyclohexane-3'-pyrido[3,4-e][1,3]dioxepin]-9'-ol. Two recrystallizations from the same solvent system gave purified product, M.P. 167–169° (in vacuo).

*Example 12*

100 mg. of 1',5'-dihydro-8'-methylspiro[cyclohexane-3'-pyrido[3,4-e][1,3]dioxepin]-9'-ol was dissolved in 10 ml. of 1 N hydrogen chloride, heated on a steam bath for 15 minutes and evaporated to dryness yielding crude pyridoxol hydrochloride. After one crystallization from absolute ethanol, the product was identical in all respects with an authentic specimen of pyridoxol hydrochloride.

*Example 13*

A solution of 100 mg. of 1,5-dihydro-8-methyl-3-phenylpyrido[3,4-e][1,3]dioxepin-9-ol in 10 ml. of 1 N hydrochloric acid was heated on the steam bath for 15 minutes. Evaporation of the aqueous solution gave a residue which was crystallized from absolute ethanol to give crystalline crude pyridoxol hydrochloride, M.P. 202–203° (dec.), which proved to be identical in all respects with an authentic specimen of pyridoxol hydrochloride after one recrystallization from absolute ethanol.

*Example 14*

200 mg. of 1,5-dihydro-3-isopropyl-8-methylpyrido[3,4-e][1,3]dioxepin-9-ol was dissolved in 20 ml. of 1 N hydrogen chloride, heated on a steam bath for 15 minutes and evaporated to dryness yielding crude pyridoxol hydrochloride. After one crystallization from absolute ethanol, the product was identical in all respects with an authentic specimen of pyridoxol hydrochloride.

*Example 15*

50 mg. of 1,5-dihydro-8-methylpyrido[3,4-e][1,3]dioxepin-9-ol was dissolved in a mixture of 5 ml. acetic acid, 1 ml. water and 0.1 ml. perchloric acid (72%). The solution was heated at reflux temperature for 3 hours. The solvents were removed in vacuo and the residue was crystallized from ethanolic hydrogen chloride affording crude pyridoxol hydrochloride which melted at 197° (dec.). Recrystallization from ethanol gave a substance, M.P. 208–09° (dec.), which proved to be identical in all respects with an authentic specimen of pyridoxol hydrochloride.

*Example 16*

1 ml. of 4-methyl-5-oxazolecarbonitrile and 8.5 g. of 4,7-dihydro - 2 - isopropyl-1,3-dioxepin were introduced into a tube which was sealed and heated for 64 hours at 180°. After cooling, the reaction mixture was transferred to a 500 ml. round bottomed flask and taken to dryness in vacuo. The residue, after dissolution in ethyl acetate, was treated with charcoal and taken to complete dryness. The so obtained residue was then dissolved in 50 ml. of hot 1 N hydrochloric acid and taken to dryness. Crystallization of the residue afforded crystalline crude pyridoxol hydrochloride, M.P. 202–203° (dec.). After one recrystallization from ethanol, material was obtained which proved to be identical in all respects with an authentic specimen of pyridoxol hydrochloride.

*Example 17*

2 ml. of 4-methyl-5- oxazolecarbonitrile and 21.2 g. of 4,7-dihydro-2-phenyl-1,3-dioxepin were combined and heated in a sealed tube at 180° for 34 hours. The reaction mixture was cooled and taken to complete dryness at high vacuum. The residue was extracted with 800 ml. of ether and insoluble material was filtered off and discarded. The filtrate was treated with charcoal and magnesium sulfate, filtered and exaporated in vacuo to dryness by means of a rotary evaporator. Treatment of the residue with ethanolic hydrogen chloride afforded directly crystalline crude pyridoxol hydrochloride, M.P. 197–199° (dec.), which proved to be identical in all respects with an authentic specimen of pyridoxol hydrochloride after one recrystallization from absolute ethanol.

*Example 18*

3 ml. of 4-methyl-5-oxazolecarbonitrile and 30.3 g. of 4′,7′-dihydrospiro[cyclohexane-1,2′[1,3] - dioxepin] were combined and heated in a sealed tube at 180° for 40 hours. The reaction mixture was cooled and taken to complete dryness at high vacuum. The residue was extracted with 800 ml. of ether and insoluble material was filtered off and discarded. The filtrate was treated with charcoal and magnesium sulfate, filtered and evaporated in vacuo to dryness by means of a rotary evaporator. Treatment of the residue with ethanolic hydrogen chloride afforded directly crystalline crude pyridoxol hydrochloride, M.P. 201–203° (dec.), which proved to be identical in all respects with an authentic specimen of pyridoxol hydrochloride after one recrystallization from absolute ethanol.

*Example 19*

3 ml. of 4-methyl - 5 - oxazolecarbonitrile and 25.2 g. of 4,7-dihydro - 2 - propenyl - 1,3 - dioxepin were combined and heated in a sealed tube at 180° for 17 hours. The reaction mixture was cooled and taken to complete dryness at high vacuum. The residue was extracted with 800 ml. of ether and insoluble material was filtered off and discarded. The filtrate was treated with charcoal and magnesium sulfate, filtered and evaporated in vacuo to dryness by means of a rotary evaporator. The residue was chromatographed on silica (Florisil, Floridin Co., Tallahassee, Fla.) and the product eluted by ether. No attempt was made to crystallize the product (1,5-dihydro-8-methyl - 3 - propenylpyrido[3,4-e][1,3]dioxepin - 9-ol). Treatment with ethanolic hydrogen chloride afforded directly crystalline crude pyridoxol hydrochloride, M.P. 202–204° (dec.), which proved to be identical in all respects with an authentic specimen of pyridoxol hydrochloride after one recrystallization from absolute ethanol.

*Example 20*

3 ml.of 4-methyl - 5 - oxazolecarbonitrile and 23.1 g. of 4,7-dihydro - 2,2 - dimethyl - 1,3 - dioxepin were combined and heated in a sealed tube at 180° for 34 hours. The reaction mixture was cooled and taken to complete dryness at high vacuum. The residue was extracted with 800 ml. of ether and insoluble material was filtered off and discarded. The filtrate was treated with charcoal and magnesium sulfate, filtered and evaporated in vacuo to dryness by means of a rotary evaporator. No attempt was made to crystallize the product (1,5-dihydro-3,3,8-trimethylpyrido[3,4-e][1,3]dioxepin - 9 - ol). Treatment with ethanolic hydrogen chloride afforded directly, crystalline crude pyridoxol hydrochloride, M.P. 202–202.5° (dec.), which proved to be identical in all respects with an authentic specimen of pyridoxol hydrochloride after one recrystallization for absolute ethanol.

*Example 21*

A mixture of 4-methyl - 5 - ethoxyoxazole (6.4 g.) and 4,7-dihydro - 2 - isopropyl - 1,3 - dioxepin (42.6 g.) was heated in an autoclave to 180° for 30 hours. The mixture was allowed to cool, and then was rinsed out of the liner with about 135 cc. of methanol. A dark solution containing 1,5 - dihydro - 3 - iso - propyl-8-methyl-pyrido [3,4-e][1,3]dioxepin - 9 - ol was obtained and was concentrated in vacuo. The dark, viscous residue was then dissolved in 25 cc. of 2 N HCl, and this solution was concentrated in vacuo. The residue was dissolved in 25 cc. of ethanol, and to the solution was added 25 cc. of ethanolic HCl (37%) and 7 cc. of water. Crystallization of pyridoxol hydrochloride occurs almost immediately. The mixture was cooled to 0° for several hours and filtered; yielding crude pyridoxol hydrochloride, M.P. 194.5–196° (uncorr.).

*Example 22*

3.0 ml of 4 - methyl - 5 - oxazolecarbonitrile and 18.0 g. of 4,7 - dihydro - 1,3 - dioxepin were combined and heated at 100° for 7 days. After cooling, the reaction mixture was taken to complete dryness at high vacuum and the residue dissolved in hot ethanolic hydrogen chloride. Upon addition of ether and subsequent cooling, crystallization occurred affording crude 1,5-dihydro-8 - methylpyrido[3,4-e][1,3]dioxepin-9-ol hydrochloride. Repeated crystallization from absolute ethanol-ether gave purified product, M.P. 208–208.5°.

*Example 23*

400 mg. of the acetate of 1,5-dihydro - 8 - methylpyrido [3,4-e][1,3] dioxepin - 9 - ol hydrochloride were dissolved in 20 ml. of 12 N methanolic hydrogen chloride and refluxed for 16 hours. Upon cooling, crystallization occurred affording pyridoxol hydrochloride, M.P. 207–208° (dec.).

*Example 2*

A solution of 24.0 g. of 4-methyl-5-methoxyoxazole in 180.9 g. of 4,7-dihydro-2-isopropyl-1,3-dioxepin was heated at 180° in an autoclave for 24 hours. The intermediate 1,5-dihydro-3-isopropyl-8-methylpyrido[3,4-e][1,3]dioxepin-9-ol was not isolated, but the reaction mixture was concentrated in vacuo to remove excess 2-isopropyl-1,3-dioxep-5-ene, and to the dark residue was added 150 cc. of 3 N hydrochloric acid. The mixture was warmed on a stream bath for thirty minutes, and then was concentrated in vacuo. The residue was dissolved in 200 cc. of alcoholic hydrochloric acid (18%) and cooled to 0°. Pyridoxol hydrochloride was obtained by filtration, M.P. 195–196° (uncorr.), unchanged on admixture with an authentic sample.

The above-mentioned 4-methyl-5-methoxyoxazole and its preparation are not a part of this invention, but such are disclosed hereinbelow in order that this disclosure may be complete.

20 g. of the methyl ester of N-formyl-alanine in 200 ml. of dried chloroform was treated with 80 g. of phosphorus pentoxide and stirred under reflux for 5 hours. The mixture was then decomposed with ice and 2 N sodium hydroxide solution, and extracted twice with chloroform. The chloroform was evaporated and the residue distilled giving 3.24 g. of 4-methyl-5-methoxyoxazole of boiling point 140°–142° C./760 mm.

We claim:

1. A process which comprises reacting a compound of the formula:

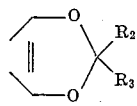

wherein $R_2$ and $R_3$ are each a member of the group consisting of, individually, hydrogen, lower alkyl, lower alkenyl, phenyl and, taken together, lower alkylene, with an oxazole of the formula:

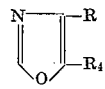

wherein R is lower alkyl and $R_4$ is a member of the group consisting of lower alkoxy and cyano to form a compound of the formula:

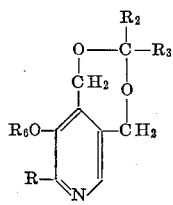

wherein R, $R_2$ and $R_3$ have the same meaning as above and $R_6$ is a member of the group consisting of hydrogen and lower alkanoyl.

2. A process for the preparation of a compound of the formula:

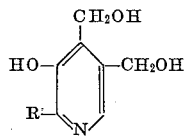

wherein R is lower alkyl which comprises acid hydrolysis of a compound of the formula:

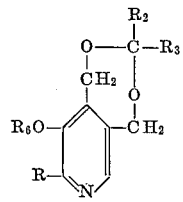

wherein R has the same meaning as above; $R_2$ and $R_3$ are each a member of the group consisting of, individually, hydrogen, lower alkyl, lower alkenyl, phenyl and, taken together, lower alkylene; and $R_6$ is a member selected from the group consisting of hydrogen and lower alkanoyl.

3. A process which comprises reacting a compound of the formula:

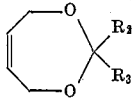

wherein $R_2$ and $R_3$ are each a member of the group consisting of, individually, hydrogen, lower alkyl, lower alkenyl, phenyl and, taken together, lower alkylene, with an oxazole of the formula:

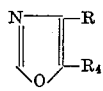

wherein R is lower alkyl and $R_4$ is a member of the group consisting of lower alkoxy and cyano, thus obtaining a compound selected from the group consisting of compounds of the formula:

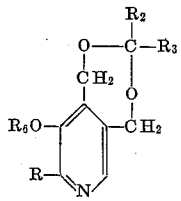

wherein R, $R_2$ and $R_3$ have the same meaning as above and $R_6$ is a member of the group consisting of hydrogen and lower alkanoyl, and acid addition salts thereof which compound is then hydrolyzed via acidification thereby forming a compound selected from the group consisting of compounds of the formula:

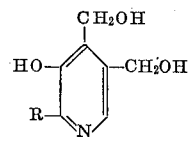

wherein R is lower alkyl and acid addition salts thereof.

4. In a process for the preparation of a compound of the formula:

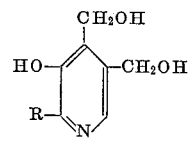

wherein R is lower alkyl, the step which comprises reacting a compound of the formula:

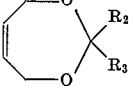

wherein $R_2$ and $R_3$ are each a member of the group consisting of, individually, hydrogen, lower alkyl, lower alkenyl, phenyl and, taken together, lower alkylene, with an oxazole of the formula:

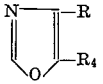

wherein R has the same meaning as above, and $R_4$ is a member of the group consisting of lower alkoxy and cyano.

5. A process which comprises reacting at a temperature between about 80° C. and about 250° C., 4,7-dihydro-1,3-dioxepin with 4-methyl-oxazole carbonitrile to form 1,5-dihydro-8-methylpyrido[3,4-e][1,3]dioxepin-9-ol.

6. A process which comprises reacting at a temperature between about 80° C. and about 250° C., 4,7-dihydro-2-isopropyl-1,3-dioxepin with 4-methyl-5-oxazole carbonitrile to form 1,5 - dihydro - 3-isopropyl-8-methylpyrido-[3,4-e][1,3]dioxepin-9-ol.

7. A process which comprises reacting at a temperature between about 80° C. and about 250° C., 4,7-dihydro-2-propenyl-1,3-dioxepin with 4-methyl-5-oxazole carbonitrile to form 1,5-dihydro-8-methyl-3-propenylpyrido[3,4-e][1,3]dioxepin-9-ol.

8. A process which comprises reacting at a temperature between about 80° C. and about 250° C., 4,7-dihydro-2-isopropyl-1,3-dioxepin with 4-methyl-5-lower alkoxy-oxazole to form 1,5 - dihydro - 3-isopropyl-8-methylpyrido-[3,4-e][1,3]dioxepin-9-ol.

9. A process for the preparation of pyridoxol hydrochloride which comprises acid hydrolysis with hydrogen chloride of 1,5-dihydro-8-methyl-3-propenylpyrido[3,4-e][1,3]dioxepin-9-ol.

10. A process for the preparation of a pyridoxol hydrochloride which comprises acid hydrolysis with hydrogen chloride of 1,5-dihydro-8-methylpyrido[3,4-e][1,3]dioxepin-9-ol.

11. A process for the preparation of pyridoxol hydrochloride which comprises acid hydrolysis with hydrogen chloride of 1,5-dihydro-3-isopropyl-8-methylpyrido[3,4-e][1,3]-dioxepin-9-ol.

12. A compound of the formula:

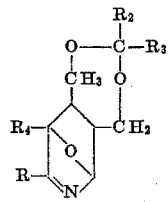

wherein R is lower alkyl; $R_2$ and $R_3$ are each selected from the group consisting of, individually, hydrogen, lower alkyl, lower alkenyl, phenyl and, taken together, lower alkylene; $R_4$ is selected from the group consisting of lower alkoxy and cyano.

13. A compound selected from the group consisting of compounds of the formula:

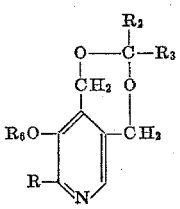

wherein R is lower alkyl; $R_2$ and $R_3$ are each selected from the group consisting of, individually, hydrogen, lower alkyl, lower alkenyl, phenyl and, taken together, lower alkylene; and $R_6$ is a member selected from the group consisting of hydrogen and lower alkanoyl and acid addition salts thereof.

14. A compound selected from the group consisting of compounds of the formula:

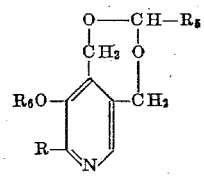

wherein R is lower alkyl, $R_5$ is a member of the group consisting of hydrogen, lower alkyl, lower alkenyl and phenyl; and $R_6$ is a member of the group consisting of hydrogen and lower alkanoyl;

and acid addition salts thereof.

15. 1,5 - dihydro-8-methylpyrido[3,4-e][1,3]dioxepin-9-ol.

16. 1,1-dihydro-3-lower alkyl-8-lower alkylpyrido[3,4-e][1,3]dioxepin-9-ol.

17. 1,5 - dihydro - 3 - isopropyl - 8 - methylpyrido-[3,4-e][1,3]dioxepin-9-ol.

18. 1,5 - dihydro - 8 - methyl - 3 - phenylpyrido[3,4-e][1,3]dioxepin-9-ol.

19. 1,5-dihydro-8-lower alkyl-3-lower alkenylpyrido-[3,4-e][1,3]dioxepin-9-ol.

20. 1,5 - dihydro - 8 - methyl - 3 - propenylpyrido-[3,4-e][1,3]dioxepin-9-ol.

21. 1',5' - dihydro - 8' - lower alkylspiro[cycloalkane-3'-pyrido[3,4-e][1,3]dioxepin]-9'-ol.

22. 1',5' - dihydro - 8' - methylspiro - 7 - [cyclohexane-3'-pyrido[3,4-e][1,3]dioxepin]-9'-ol.

References Cited by the Examiner
UNITED STATES PATENTS

| | | | |
|---|---|---|---|
| 2,260,261 | 10/1941 | Morey | 260—338 |
| 2,312,743 | 3/1943 | Arundale et al. | |
| 2,520,038 | 8/1950 | Hultquist et al. | 260—297.5 |
| 2,875,207 | 2/1959 | Clauson-Kass et al. | 260—297.5 |
| 2,870,097 | 1/1959 | Pattison | 260—338 |

OTHER REFERENCES

Huang et al.: Izo. Akad. Nauk S.S.S. R. Odt. Khim. Nawk (1962), pp. 525–6.

Harris et al.: J. Org. Chem., vol. 27, pp. 2705–6 (1962).

WALTER A. MODANCE, *Primary Examiner.*

JOHN D. RANDOLPH, *Examiner.*

R. T. BOND, *Assistant Examiner.*